(12) United States Patent
Strebig et al.

(10) Patent No.: US 7,849,894 B2
(45) Date of Patent: Dec. 14, 2010

(54) LOG ROTATION AND VERIFICATION SYSTEM AND METHOD

(75) Inventors: Paul W. Strebig, Ridgefield, WA (US); Christopher W. Blomquist, Ridgefield, WA (US)

(73) Assignee: U.S. Natural Resources, Inc., Woodland, WA (US)

( * ) Notice: Subject to any disclaimer, the term of this patent is extended or adjusted under 35 U.S.C. 154(b) by 1052 days.

(21) Appl. No.: 11/361,568

(22) Filed: Feb. 24, 2006

(65) Prior Publication Data

US 2006/0207686 A1 Sep. 21, 2006

Related U.S. Application Data

(60) Provisional application No. 60/663,358, filed on Mar. 17, 2005.

(51) Int. Cl.
*B23Q 15/00* (2006.01)

(52) U.S. Cl. .................. 144/357; 144/394; 144/404; 144/2.1; 144/1.1; 144/3.1

(58) Field of Classification Search .................. 144/356, 144/357, 382, 392, 394, 402, 404, 1.1, 2.1, 144/3.1, 359, 376
See application file for complete search history.

(56) References Cited

U.S. PATENT DOCUMENTS

| | | | |
|---|---|---|---|
| 3,886,372 A | 5/1975 | Sanglert | |
| 3,981,393 A | 9/1976 | Landers | |
| 4,120,333 A | 10/1978 | Hellgren et al. | |
| 4,158,778 A | 6/1979 | Gard et al. | |
| 4,413,662 A | 11/1983 | Gregoire et al. | |
| 4,489,635 A | 12/1984 | Cooper | |
| 4,515,196 A | 5/1985 | Shields | |
| 4,665,786 A | 5/1987 | Shields | |
| 4,947,909 A * | 8/1990 | Stroud | 144/357 |
| 5,042,341 A * | 8/1991 | Greten et al. | 83/75.5 |
| 5,228,112 A | 7/1993 | Lemelson | |
| 5,257,101 A | 10/1993 | Lee | |
| 5,429,161 A | 7/1995 | Allard | |
| 5,765,617 A * | 6/1998 | Mierau et al. | 144/387 |
| 5,918,653 A | 7/1999 | Knerr | |
| 6,072,890 A | 6/2000 | Savard et al. | |
| 6,757,354 B2 | 6/2004 | Skatter et al. | |
| 6,778,681 B2 | 8/2004 | Garms et al. | |
| 7,171,278 B2 | 1/2007 | Baker et al. | |
| 7,280,687 B2 | 10/2007 | Ban et al. | |
| 2006/0048853 A1 | 3/2006 | Boyd et al. | |

FOREIGN PATENT DOCUMENTS

| | | | |
|---|---|---|---|
| AU | 2004100409 A4 | | 6/2004 |
| CA | 2480976 | * | 3/2006 |
| CA | 2480976 A1 | | 3/2006 |
| CA | 2518681 A1 | | 3/2006 |
| EP | 1 215 004 B1 | | 9/2005 |

\* cited by examiner

*Primary Examiner*—Shelley Self
(74) *Attorney, Agent, or Firm*—Schwabe, Williamson & Wyatt

(57) ABSTRACT

Embodiments of the present invention provide a log rotation verification system having an optimizer configured to determine an optimized cutting solution for the log and configured to identify an optimized rotational position, and a position indicator applicable to a log to indicate a reference rotational position of the log. A log rotator may be configured to rotate the log to reduce the difference between the reference rotational position and the optimized rotational position. And, a primary detector may be configured to detect a current rotational position of the position indicator.

17 Claims, 3 Drawing Sheets

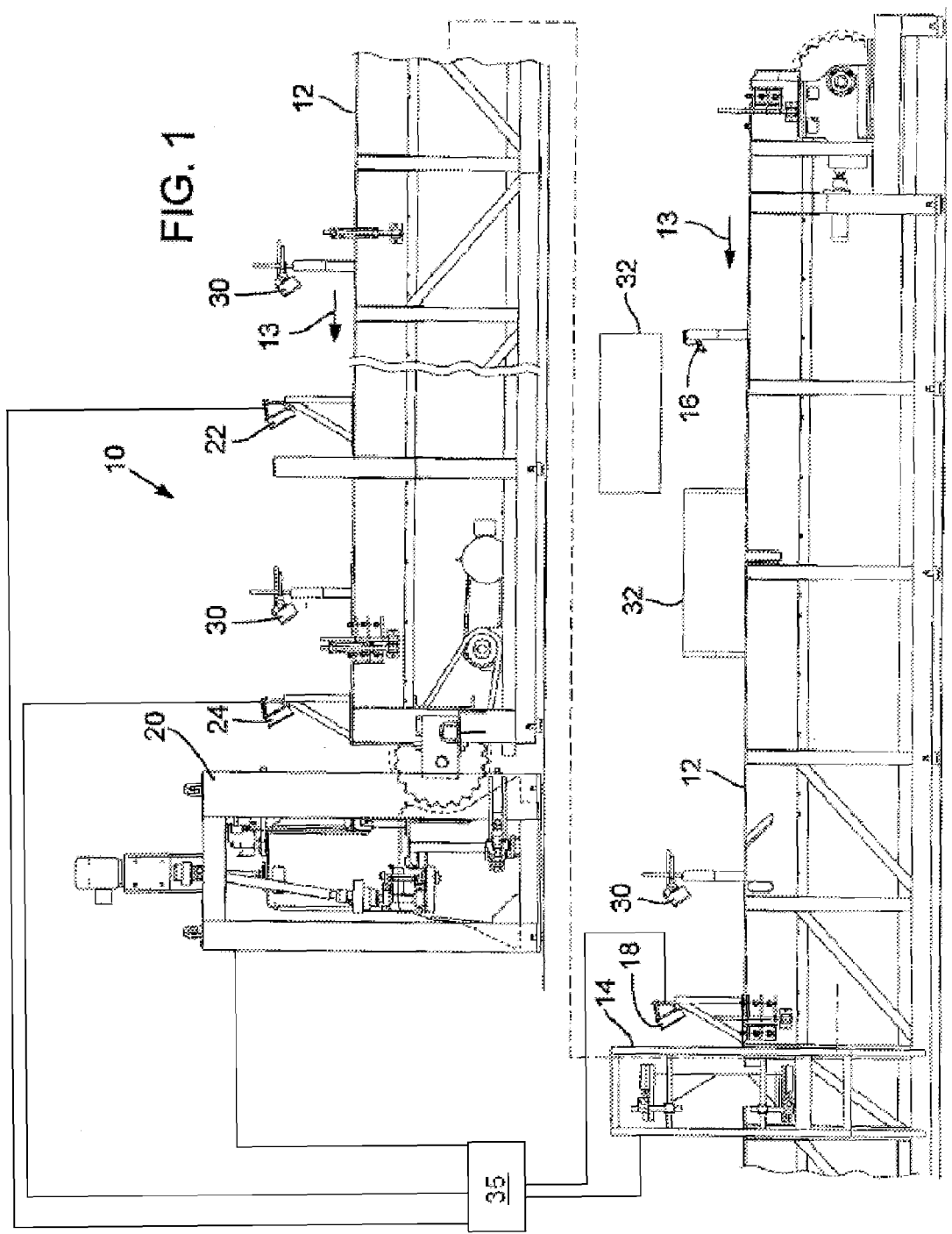

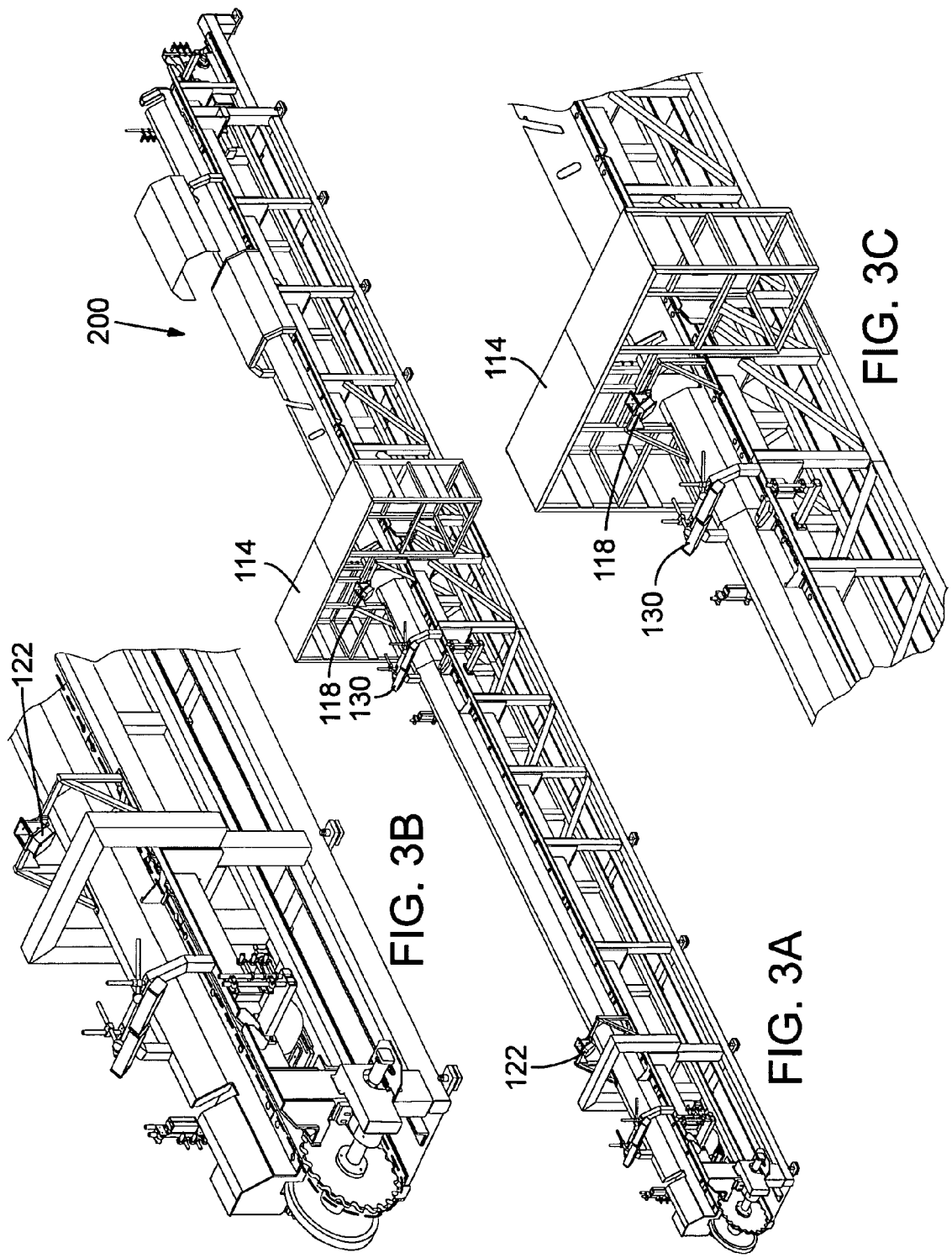

LOG ROTATION AND VERIFICATION SYSTEM AND METHOD

RELATED APPLICATIONS

This application claims the benefit of U.S. Provisional Patent Application Ser. No. 60/663,358 entitled LOG ROTATION VERIFICATION METHOD AND APPARATUS, filed Mar. 17, 2005.

TECHNICAL FIELD

Embodiments of the present invention relate to the field of log processing methods and equipment, and more specifically, to devices and methods for tracking, verifying, and/or correcting the rotation of a log in a particular processing unit.

BACKGROUND

Generally, it is desirable to rotate logs in a processing machine to a position that corresponds with an optimized position, which may be determined by, for example, an optimized cutting solution generated by an optimizer. Based on the optimized cutting solution, the log is rotated the degree that the machine believes is required. Due to processing and log variations, the actual degree of rotation may deviate from the optimized position, and without additional scanning or other characterization steps, the degree of variation may not be readily known, verified, tracked or otherwise accounted for in the processing equipment. Further, additional log movement may occur from the point the log is turned to the point of processing. Thus, it is desirable to easily track the rotational position of the log during various phases of the log processing system, and, if necessary, make corrections (e.g., further turn the log or manipulate the processing equipment, recalculate an optimized cutting solution, etc.) in order to minimize deviation from the optimized rotational position to achieve the optimized cutting solution.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 1 illustrates a side view of a log rotation verification system in accordance with various embodiments of the present invention;

FIG. 3A illustrates perspective view and FIGS. 3B and 3C illustrate detailed perspective views of a log rotation verification system illustrating one embodiment in accordance with the invention.

DETAILED DESCRIPTION OF EMBODIMENTS OF THE INVENTION

Figure 2A:
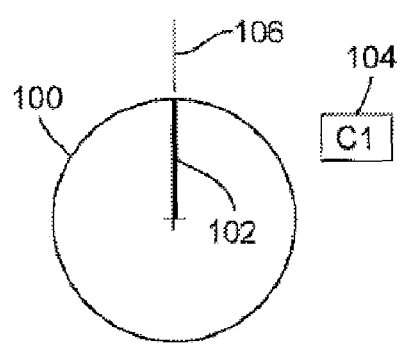
FIGS. 2A through 2E are schematic views illustrating an end of a log as it may progress through a log rotation verification system in accordance with various embodiments of the invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The following description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means "A or B." For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Embodiments of the present invention may include marking a portion of the log with a position indicator, which one or more imaging devices (also referred to herein as a "detector") may capture and record at different locations in a process, such that the degree of log rotation may be easily tracked, verified, and, if desired, further rotated a determined amount. Embodiments of the present invention may also include marking the end of a log being processed with one or more position indicators, such as one or more lines, codes, labels, or other distinguished markings, which can be captured and recorded by an imaging device, such as high-resolution cameras, CCD sensors, and the like. One embodiment of the present invention may include a position indicator that is a stripe, dot and/or any other shape, and may be made with, for example, a paint and/or fluorescing dye. In one embodiment the dye may be sprayed on one end of the log, for example, the trailing end of the log.

As the log moves through the process, additional imaging devices may record the log's position indicator at a given location. This data may then be compared to the log's initial angular or rotational position, to verify the amount the log has been rotated. The resulting rotational data can be used for a variety of reasons, such as to: 1) implement a rotational correction procedure; 2) initiate a correctional procedure on the processing equipment itself such that the log is not further rotated; and/or 3) generate a new optimization cutting solution based on the determined current rotational position of the log.

FIG. 1 illustrates a side view of a log rotation system 10 illustrating one embodiment in accordance with the invention. The log rotation system 10 may include a log conveyor 12 adapted to convey logs (not shown) along at least most of its length in a direction of travel indicated with an arrow 13. The log rotation system 10 may include an optimizer 14 adapted to determine an optimized cutting solution or profile for a log and to identify an optimized rotational position for processing the log according to the optimized cutting solution.

A position indicator may be applicable to the end of the log to indicate a reference rotational position of the log (example embodiments discussed further with respect to FIGS. 2A-2E). The position indicator may be, for example, one or more lines that may be sprayed or otherwise applied to an end of the log with one or more spray heads 16. In one embodiment, the spray line may be applied to the end of the log and in a generally vertical position. In other embodiments, multiple lines may be applied, and/or any line or multiple lines may be applied in any given orientation.

A reference detector 18 may be adapted to detect a reference rotational position of the log based on the position of the log position indicator. In one embodiment, the first detector may be positioned upstream from the optimizer 14 and may be disposed to capture the reference rotational position before or while the optimizer 14 is in the process of determining the optimized cutting solution. In various embodiments the first detector may be positioned otherwise relative to the optimizer 14, such as directly downstream of the optimizer 14 such that it captures the reference rotational position after scanning by the optimizer 14. The reference rotational position may be communicated to a controller (discussed further below), which may be used in confirming and/or verifying the amount of rotation from an initial starting point.

In one embodiment of the present invention, the position indicator may be assumed to be in a particular orientation at the optimizing station. That assumed orientation may be considered the reference rotational position. For example, the positional indicator may be applied to the end of the log in a generally vertical fashion. In such a case, the position indicator would be assumed to be vertical, despite the potential for slight rotational movement during the scanning of the log in the optimizer 14, and the reference rotational position would then be assumed to be approximately 0 degrees. In other embodiments, the positional indicator may be positioned otherwise (e.g., horizontal), or at any location around the circumference of the log end, and a similar assumption may be made with respect to the reference rotational position.

A log rotator 20 may be adapted to rotate the log to reduce the difference between the reference rotational position and the optimized rotational position of the log. The log rotator 20 may be of a number of turning pieces of equipment, including, but not limited to knuckle turners, End Doggers, Sharp Chain Log Turners, rollers, and other log turning devices. The log rotator 20 may also be adapted to make one or more turns of the log, depending on the need for one or more correctional turns.

A primary detector 22 may be adapted to detect a current rotational position of the position indicator once the log has either made a first determined turn, or, in the case of a shorter log, the position of the position indicator while the short log is in rotation. In one embodiment, the detectors may include one or more machine vision cameras, such as high-resolution color and/or gray scale CCD sensors and other image capturing devices.

In one embodiment, a secondary detector 24 may be disposed to detect a post-turn and/or a precut rotational position, which may also be considered the actual rotational position of the log before the log is further processed. Based on the information captured by the secondary detector, adjustments may be made to the downstream processing equipment in order to adjust the equipment to cut the log according the optimized cutting solution.

In one embodiment, one or more controllers 35 may be coupled to various elements of the log rotation system 10. For example, the controller may be coupled to the detectors 18, 22 and/or 24, optimizer 14, and/or rotator 20, and may collect data on the reference rotational position, optimized rotational position, current rotational position, and/or precut or final rotational position of the log being processed. The controller may cause the log rotator 20 to perform a corrective log rotation to minimize, eliminate, or bring to within a predetermined range, such as a user specified parameter, the difference between the reference rotational position and the optimized rotational position.

In one embodiment, the controller may also capture differences between expected and actual rotational positions of the logs being processed, which may be used for performance evaluation of the system 10 and/or components thereof. In other embodiments, the controller may cause the processing equipment to adjust such that the log may be cut according to the optimized cutting solution, despite the fact that the actual rotational position of the log deviates from the optimized rotational position.

In various embodiments, the primary detector 22 may capture the image of the positional indicator prior to the log completing its rotation/turn. This may happen, for example, when a shorter log is being processed, and the end with the position indicator passes the primary detector prior to completion of the first turn. When this is the case, the controller may compare the actual rotational position as detected by the primary detector with the anticipated rotational position of the log at a similar point in time based on the optimized cutting solution to determine a current rotational difference. If the current rotational difference is outside a predetermined range, then the controller may cause corrective action to be taken, such as: 1) cause the log rotator to increase or decrease the rotation in order to reduce the difference by the completion of the turn; 2) generate a new cutting solution; and/or 3) cause the downstream processing equipment to change its parameters to accommodate the difference and still process the log substantially according to the optimized cutting solution.

In another embodiment where the primary detector captures the position indicator prior to turn completion, thus capturing the actual rotational position, the controller may, based on the actual rotational position and the current turn solution, determine an expected difference between a predicted final rotational position of the log once the turn has completed and the optimized rotational position. If the expected difference is outside a predetermined range, then the controller may cause corrective action to be taken, such as: 1) cause the log rotator to increase or decrease the rotation in order to reduce the difference by the completion of the turn; 2) generate a new cutting solution; and/or 3) cause the downstream processing equipment to change its parameters to accommodate the difference and still process the log substantially according to the optimized cutting solution.

In various embodiments according to the invention the log rotation system 10 may be equipped with lights 30 disposed to ensure the detectors 18, 22, and/or 24 properly detect the position indicator. In other embodiments, covers 32 may be provided to protect surrounding area from the spray heads 16. One cover 32 is illustrated in the figure raised above the conveyor 12 for illustration.

FIGS. 2A through 2E are schematic views illustrating an end of a log 100 as it may progress through a log rotation verification and/or control system in accordance with various embodiments of the invention. In FIG. 2A the log 100 has been marked with a position indicator 102 by, for example, a spray head (not shown). A first detector, such as a first camera 104, may be adapted to detect a reference rotational position 106. In another embodiment, the position indicator may be assumed to be vertical, and thus the rotational position 106 may be assumed.

Figure 2B:
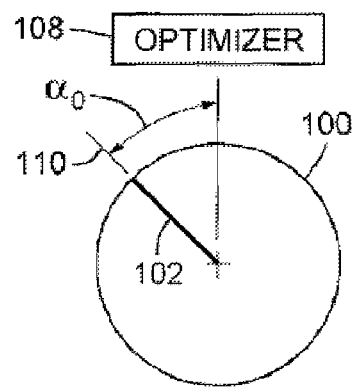

As illustrated in FIG. 2B, an optimizer 108 may be adapted to determine a an optimized rotational position 110, which is represented here by the indicator 102 being positioned at the optimized rotational position 110. Accordingly, an angle of rotation $\alpha_0$ is the desired turn angle for the log in order to achieve processing according to the optimized cutting solution. A controller may attempt to cause a log rotator (not shown) to rotate log 100 an angle of $\alpha_0$.

Figure 2C:
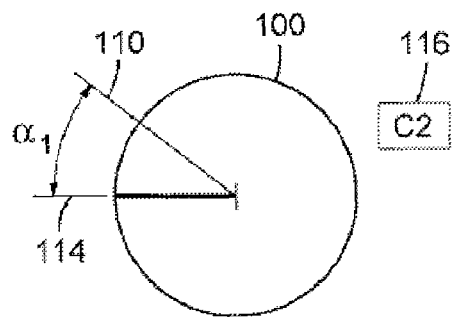

However, due to a variety of processing conditions, it may be likely that the current rotational position after a first turn is different than expected, e.g. over rotation. FIG. 2C illustrates the log being at a current rotational position 114 after a first turn, which is past the optimized rotational position 110 by $\alpha_1$. A primary Camera 116 may detect the second rotational position 114.

A controller may determine the difference between the current rotational position 114 and the optimized rotational position 110 (e.g., $\alpha_1$). If the difference is within a user specified range or tolerance (e.g. ±5 degrees), then no further turn would be required. However, if the difference is greater than acceptable, the controller may calculate an angle of correction, which may be approximately equal to $\alpha_1$. The log rotator may then cause a further rotation of the log, which may be referred to as a corrective or second turn.

Figure 2D:
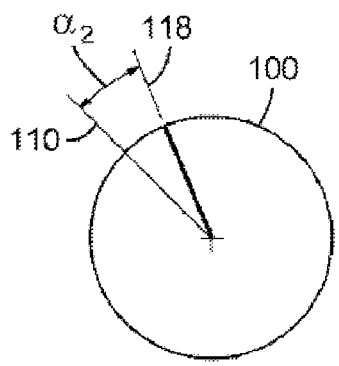

In one embodiment, after the second turn, the position indicator 102 may indicate the log as being in a substantially final rotational position 118 as illustrated in FIG. 2D. The substantially final rotational position 118, as illustrated in this example, may also not be equal to the optimized rotational position 110 by a rotational amount and/or angle of $\alpha_2$. The difference $\alpha_2$ may be detected by a secondary detector 120. If the difference is not within the predetermined range that may be specified by the user, the controller may resolve a further correction angle of $-\alpha_2$ that may be required in order to have the log rotated to the optimized rotational position.

Figure 2E:
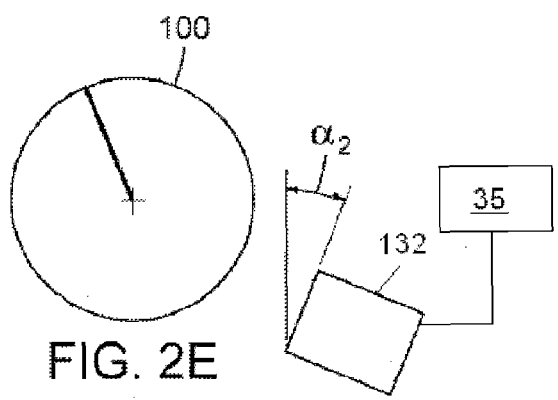

As a result one or more of the following may occur: the log may be further rotated; a re-optimized a cutting solution may be determined based on the current rotational position of the log; diagnostic data useful for diagnosing performance of the log orientation verification system may be collected; and/or processing equipment may be rotated to compensate for all or part of the final difference. FIG. 2E schematically illustrates the cutting equipment 132 having been rotated to compensate for all or part of a final difference $-\alpha_2$.

In one embodiment, where shorter logs are being processed, the current rotational position as detected by the primary detector will be at a turn angle that is not yet completed the turn to which the rotator is attempting to turn. Accordingly, the data generated on current rotational position detected by the primary detector may be accounted for by the controller and recalibrate the controller with actual position data. The controller may then modify the amount of turn it originally was going to cause the rotator to turn the log in order to achieve the optimized rotational position.

FIG. 3A illustrates a perspective view and FIGS. 3B and 3C illustrate detailed perspective views of a log rotation, or orientation verification system 200 illustrating one embodiment in accordance with the invention. The system 200 is set up substantially similar to the system 10 illustrated in FIG. 1 except it includes two detectors 118 and 122. In the illustrated embodiment, the first detector 118 and a light 130 may be positioned downstream from an optimizer 114, such that the reference rotational position may be established and any rotational movement of the log while in the optimizer may be accounted for.

Verification and/or correction of the rotational position of a log may be useful in a number of log processing machines, including, but not limited to small log processing machines, double and single length infeeds, close coupled end dogging systems, sharp chain log turners, and any other process where knowing/tracking the rotational position of the log is advantageous.

The position indicator may be placed on the log in a variety of locations during the process, including, but not limited to bucking lines, log haul, steep feeders, AutoRotation conveyors, infeed conveyors, and the like. In one embodiment, the position indicator may be placed on the small end of the log such that the imaging device may capture the angular rotation of the log as it passes a particular location. In other embodiments, however, the position indicator may be placed on the large end of the log, or on the log's lengthwise portion.

In one embodiment in accordance with the present invention, parallel lines may be applied to the end of a log being processed and may act as the position indicators. Such lines may be painted on using a high efficiency paint nozzle array adapted to quickly apply lines of a desired length, width, and/or color. In one embodiment, a set of three spray nozzles may be adapted to apply a positional indicator on the end of a log. A light curtain or photocell array may be positioned upstream of the spray nozzles. Based on the position of the log end as determined by the light curtain, the appropriate spray nozzle may be activated in order to apply the positional indicator on the end of the log in as close to center orientation as possible.

In one embodiment, one or more detectors may image the position indicator to generate a reference image of the log prior to active rotation in, for example, a knuckle turner, based on an optimization solution generated by an optimizer. The log may then be rotated the desired amount. A second camera or other imaging device may record the rotated position of the log after it has been rotated the desired amount. The actual turn angle can be determined by comparing the reference image position to the rotated position based on the optimization solution. A Programmable Logic Controller (PLC) may be used to make such a comparison and initiate further process manipulations, such as additional rotation of the log to get within an acceptable tolerance from the optimized angle of rotation, to cause adjustments to the angle and position of the saws, or cause a new optimization solution to be calculated based on the determined rotational position of the log.

Various embodiments according to the invention may be utilized as follows:

A log may enter the AR conveyor and be tracked by a PLC with a specified resolution;

The log may pass through a light curtain having a specified resolution, and may send outputs that may at least characterize the diameter of the log in the Y-Axis;

As the PLC tracks the log it may record the diameter towards an end portion of the log, and then determine the approximate center of the log in the Y-axis;

The PLC may determine which of the spray nozzle array to activate in order to apply the reference position indicator that may be as close to the log center as possible. When the trailing end of the log is in a desired position relative to the spray nozzles, the PLC may turn on a determined number of heads to apply one or more lines to the end of the log. After a predetermined amount of time the spray heads may be turned off;

The log may then enter an optimizer, where the optimizer may generate and send an optimized cutting and the required angle of rotation of the log to the PLC;

The PLC may then calculate the degree the knuckle turner will rotate the log;

A first camera may be positioned before and/or after the optimizer and may take an image of the log's trailing end with the positional indicator. The reference image may be recorded and sent to the PLC;

The log may enter a turner and complete its first initial turn.

A second camera may be positioned downstream of the first camera and upstream of the turner to be able to image the log end marked with the position indicator and record the angle of the log after its initial turn. This data may be sent to the PLC; and The PLC may then determine if and how much of a corrective turn is needed, and if necessary, the PLC may command the turner to rotate the log an appropriate amount to achieve the desired corrective rotation.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A log rotation system comprising:
   an optimizer configured to identify an optimized rotational position of a log to be processed;
   a conveyor configured to convey the log in a first direction, the optimizer disposed proximal to the conveyor;
   an applicator operatively coupled to the conveyor, the applicator configured to apply a position indicator to a rearward portion of the log in a predetermined orientation to indicate a reference rotational position of the log;
   a log rotator disposed downstream of the optimizer, the log rotator configured to controllably rotate the log as the log is conveyed in the first direction;
   a primary rotational detector disposed upstream of the log rotator and downstream of the applicator, the primary rotational detector positioned to detect a current orientation of the position indicator during, after, or during and after a first rotation of the log by the log rotator and while at least a portion of the log is within the log rotator; and
   a controller communicatively coupled to the primary rotational detector, the optimizer, and the log rotator, the controller configured to
      receive data from the optimizer and the primary rotational detector,
      control the first rotation of the log by the log rotator based at least on the optimized rotational position and the reference rotational position, the reference rotational position being set based on the predetermined orientation of the position indicator,
      determine, based at least on the current orientation of the position indicator detected by the primary rotational detector, a first rotational difference between a current rotational position of the log during or after the first rotation and the optimized rotational position identified by the optimizer, and
      initiate a corrective action to compensate for said first rotational difference.

2. The log rotation system of claim 1, wherein the corrective action is a second rotation of the log by the log rotator, the controller further configured to calculate a corrective angle of rotation for the log based on the first rotational difference.

3. The log rotation system of claim 1, wherein the position indicator is a line applied to the end of the rearward portion of the log such that the predetermined orientation of the position indicator is substantially vertical, and wherein the reference rotational position is set at 0 degrees.

4. The log rotation system of claim 1, wherein the corrective action is generation of an optimized cutting solution for the log.

5. The log rotation system of claim 1, further comprising a secondary rotational detector communicatively coupled to the controller, the secondary rotational detector disposed downstream of said primary rotational detector, the secondary rotational detector configured to detect a second orientation of the position indicator after a substantially final rotation of the log.

6. The log rotation system of claim 5, wherein the controller is configured to determine a second rotational difference between the optimized rotational position and a substantially final rotational position of the log based at least on the second orientation of the position indicator and the optimized rotational position.

7. The log rotation system of claim 1, wherein the optimizer includes a rotational position scanner configured to identify the optimized rotational position of the log and an optimizing scanner configured to scan the log to help determine the optimized cutting solution for the log, the rotational position scanner and the optimizing scanner communicatively coupled to at least one of the optimizer and the controller, wherein the rotational position scanner and the optimizing scanner are separate scanners positioned upstream of the log rotator.

8. The log rotation system of claim 1, wherein the controller is configured to collect diagnostic data useful for diagnosing performance of the log rotation system.

9. The log rotation system of claim 1, wherein the controller is configured to cause the log rotator to increase or decrease rotation of the log in order to reduce said first rotational difference.

10. The log rotation system of claim 1, wherein the position indicator is one or more marks disposed on the rearward portion of the log.

11. The log rotation system of claim 10, wherein the position indicator is a selected one of an ink, paint and fluorescing dye.

12. A method for verifying and/or controlling rotation of a log to be processed, the method comprising:

applying, by an applicator, a position indicator in a predetermined orientation to a rearward portion of the log to indicate a reference rotational position of the log;

setting the reference rotational position of the log based on the predetermined orientation of the position indicator;

scanning the log and generating scan data, by a scanner operatively coupled to an optimizer;

determining, by the optimizer, an optimized rotational position for the log based on the scan data;

controlling a log rotator positioned downstream of the scanner to perform a first rotation of the log as the log is conveyed in a first direction, based at least on the optimized rotational position and the reference rotational position, to reduce a first difference between the set reference rotational position and the optimized rotational position;

detecting, by a first rotational detector positioned downstream of the scanner and upstream of the log rotator, a current orientation of the position indicator during, after or during and after the first rotation of the log by the log rotator and while at least a portion of the log is within the log rotator;

determining, based at least on the current orientation of the position indicator during or after the first rotation, a second difference between the current rotational position of the log and the optimized rotational position; and initiating a corrective action to compensate for said second difference.

13. The method of claim 12, wherein the applying a position indicator in the predetermined orientation includes applying a mark on an end of the log in the predetermined orientation and setting the reference rotational position of the log to 0 degrees based on the predetermined orientation.

14. The method of claim 12, wherein the corrective action comprises controlling the log rotator to perform a second rotation of the log based at least on said second difference.

15. The method of claim 12, the scanner comprising a rotational position scanner and a separate optimizing scanner, wherein scanning the log by the scanner and generating scan data includes:

scanning the log with the rotational position scanner and identifying the optimized rotational position of the log; and scanning the log with the separate optimizing scanner and assisting in determining an optimized cutting solution for the log.

16. The method of claim 12, wherein the corrective action comprises generating an optimized cutting solution for the log.

17. The method of claim 12, further comprising:

detecting a final rotational position of the log; and collecting performance data comprising a previous rotational position of the log and the final rotational position of the log.

* * * * *